Nov. 24, 1970 KAZUYA OSEKI ET AL 3,542,959

FOUR-WIRE TANDEM SWITCHING NETWORK HAVING MEANS FOR SELECTIVELY COUPLING CONNECTED TRUNK CIRCUITS TO PROVIDE ADDITIONAL FUNCTIONS WITHOUT INCREASING THE NUMBER OF CIRCUITS REQUIRED IN THE NETWORK

Filed Sept. 28, 1967 2 Sheets-Sheet 1

INVENTORS
KAZUYA OSEKI
YASUYUKI UBUKATA
BY
OSTROLENK, FABER, GERB & SOFFEN
ATTORNEYS

Nov. 24, 1970 KAZUYA OSEKI ET AL 3,542,959

FOUR-WIRE TANDEM SWITCHING NETWORK HAVING MEANS FOR SELECTIVELY COUPLING CONNECTED TRUNK CIRCUITS TO PROVIDE ADDITIONAL FUNCTIONS WITHOUT INCREASING THE NUMBER OF CIRCUITS REQUIRED IN THE NETWORK

Filed Sept. 28, 1967

2 Sheets-Sheet 2

INVENTORS
KAZUYA OSEKI
YASUYUKI UBUKATA

BY

OSTROLENK, FABER, GERB & SOFFEN
ATTORNEYS

United States Patent Office 3,542,959
Patented Nov. 24, 1970

3,542,959

FOUR-WIRE TANDEM SWITCHING NETWORK HAVING MEANS FOR SELECTIVELY COUPLING CONNECTED TRUNK CIRCUITS TO PROVIDE ADDITIONAL FUNCTIONS WITHOUT INCREASING THE NUMBER OF CIRCUITS REQUIRED IN THE NETWORK

Kazuya, Oseki and Yasuyuki Ubukata, Tokyo, Japan, assignors to Nippon Electric Company Limited, Tokyo, Japan Filed Sept. 28, 1967, Ser. No. 671,307
Claims priority, application Japan, Sept. 29, 1966, 41/63,748
Int. Cl. H04q 5/22
U.S. Cl. 179—18 11 Claims

ABSTRACT OF THE DISCLOSURE

This invention broadly teaches a 4-wire tandem switching network or switchboard assembly for use in toll switching systems employing a 4-wire switching network or switchboard constructed of 6-wire switches in which incoming trunks, outgoing trunks, a register, and a sender are all selectively coupled to the call initiating circuitry of the tandem calling circuit, said connections being established at selected intervals through the 4-wire switchboard assembly without the need for setting up additional incoming register and sender links conventionally employed so that the tandem switchboard functions as both the incoming register link and the sender link in addition to its normal functions. Each of the circuits which are selectively coupled to the switchboard, may be decoupled, or released, on either the incoming or outgoing sides of the switchboard.

The instant invention relates to toll switching systems of the type employed in telephone networks, and more particularly to common-control 4-wire tandem switching networks or switchboards for use in such toll switching systems in which ingoing trunks, outgoing trunks, sender and receiver circuits are all selectively coupled into the call initiating circuitry through the 4-wire switchboard without the need for setting up additional incoming register and sender links conventionally employed so that the tandem switchboard functions as both the incoming register link and the sender link in addition to its normal functions.

Individual tandem switchboards are widely used in present day telephone toll switching systems. However, 4-wire tandem switchboards provide outstanding advantages not capable of being provided by individual tandem switchboards and it is therefore preferable to substitute such assemblies for use in switching networks. However, the types of connection routes which are set up for 4-wire tandem switchboards for service and toll switching systems are quite different than the types of routes employed when using individual tandem switchboards. When it is desired to employ register and sender facilities of the combined type, it is necessary to install incoming register-sender links for connecting incoming trunks to the combined register-sender, in addition to providing the main switching frame for connecting incoming trunks to outgoing trunks. In the case where separate register and sender facilities are employed, it is necessary to provide and install incoming register links for connecting incoming trunks to the registers and further to provide and install sender links for connecting the senders to the outgoing trunks, again, in addition to providing the main switching frame.

Whether the incoming register-sender links or the incoming register link arrangements be employed in tandem switchboard facilities accommodating numerous incoming and outgoing trunks, either type invariably requires the installation of input and output terminals equal in number to the incoming trunks connected to the main switching frame and to the register-senders respectively. The systems still further require controllers in addition to the marker circuits, for the purpose of controlling all of the abovementioned units. Furthermore, there exists the necessity of providing input and output terminals equal in number to the senders in the outgoing trunks, respectively, for the sending link arrangement. It has been determined that the manufacturing cost ratio of all of the above functional units relative to the main switching frame, plus the marker circuits, amounts to several tens of percent. As a result of this, deep consideration has been given to the possibility of replacing all of the above functional units with equipment which is much less expensive and which is capable of performing equivalent functions to all of the circuits set forth above.

Therefore, a principal object of this invention is to provide a solution to the economical aspect of conventional design through the use of a novel 4-wire tandem switchboard that is much less expensive than conventional switching structures and yet which provides equivalent functions.

One distinctive feature of the system described herein is the employment of switches in the main switching frame, each of which is comprised of six or more wires utilized for establishing connection routes. Another significant feature is the provision of circuits capable of accommodating both incoming trunks and sender circuits on the inlet side of the 4-wire switchboard and further capable of accommodating both outgoing trunks and registers on the outlet side of the main switching frame wherein connections to all of the units are performed under control of marker circuits. Utilizing such an arrangement of switching equipment permits all of the incoming register-sender links, the incoming register links, the sender links, and so forth, to be dispensed with by delegating all of the functions performed by these links to the main switching frame. It, therefore, becomes possible to provide a conventional inexpensive 4-wire tandem switchboard having 4-wire tandem switchboard functions simply by increasing the number of input and output terminals on the main switching frame by an amount equal to the number of senders and registers, respectively, which may be connected to the main switching frame.

The instant invention is therefore comprised of a main switching frame of the 4-wire type which operates generally as follows:

When an incoming trunk is seized by a previous switching facility, its identity is determined by the marker circuit. The seized incoming trunk is connected to inlet terminals of the main switching frame and the register circuits are scanned to determine their availability. An idle register circuit is coupled to outlet terminals of the main switching frame so as to establish a connection between the seized incoming trunk and the selected register circuit (through the main switching frame). Either a proceed send signal is generated by the register circuit or a minimum pause interval is provided after which dial code information is transferred to the register circuit.

Upon receipt of the dialing information, this information is transferred to an available sending circuit through the marker. The sending circuit and an available outgoing trunk are coupled to respective inlet and outlet terminals of the main switching frame and the sending circuit is then caused to transmit dial code information to the outgoing trunk through the main switching frame. It should be noted at this time that the incoming trunk circuit and the sending circuit are both connected in common through the main switching frame to the outgoing trunk circuit. Upon completion of the transfer of dialing code information, the sending circuit is released and may be disconnected from the main switching frame while the path between incoming and outgoing trunk lines through the main switching frame remains established. All of the circuits coupled to either inlet or outlet terminals of the main switching frame may be released and disconnected from the main switching frame upon their own initiation.

It is therefore one object of the instant invention to provide novel switching circuitry for use in toll switching systems of the telephony type and employing a main switching frame of the 4-wire tandem switchboard type in which all of the incoming trunk, outgoing trunk, sending and receiving circuits may be selectively connected throughout the link establishing operation through the main switching frame without the need for providing separate incoming and outgoing links therefor.

Another object of the instant invention is to provide novel switching circuitry for use in toll switching systems of the telephone type and employing a main switching frame of the 4-wire tandem switchboard type in which all of the incoming trunk, outgoing trunk, sending and receiving circuits, may be selectively connected throughout the link establishing operation through the main switching frame without the need for providing separate incoming and outgoing links therefor and wherein all such circuits, as well as the main switching frame, operate under control of the marker circuit.

These, as well as other objects of the instant invention, will become apparent when reading the accompanying description and drawings in which.

In each of the above, as well as the following figures to be described, only those functional units which are directly related to the instant invention have been illustrated for purposes of simplicity.

Figure 3:
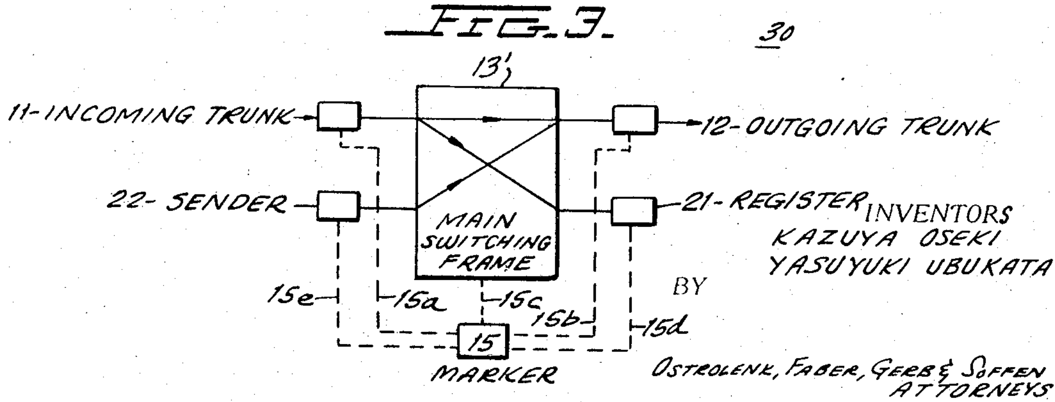

FIG. 3 is a simplified block diagram showing a 4-wire tandem switchboard, also operating on the common-control system scheme and incorporating the principles of the present invention.

Figure 4:
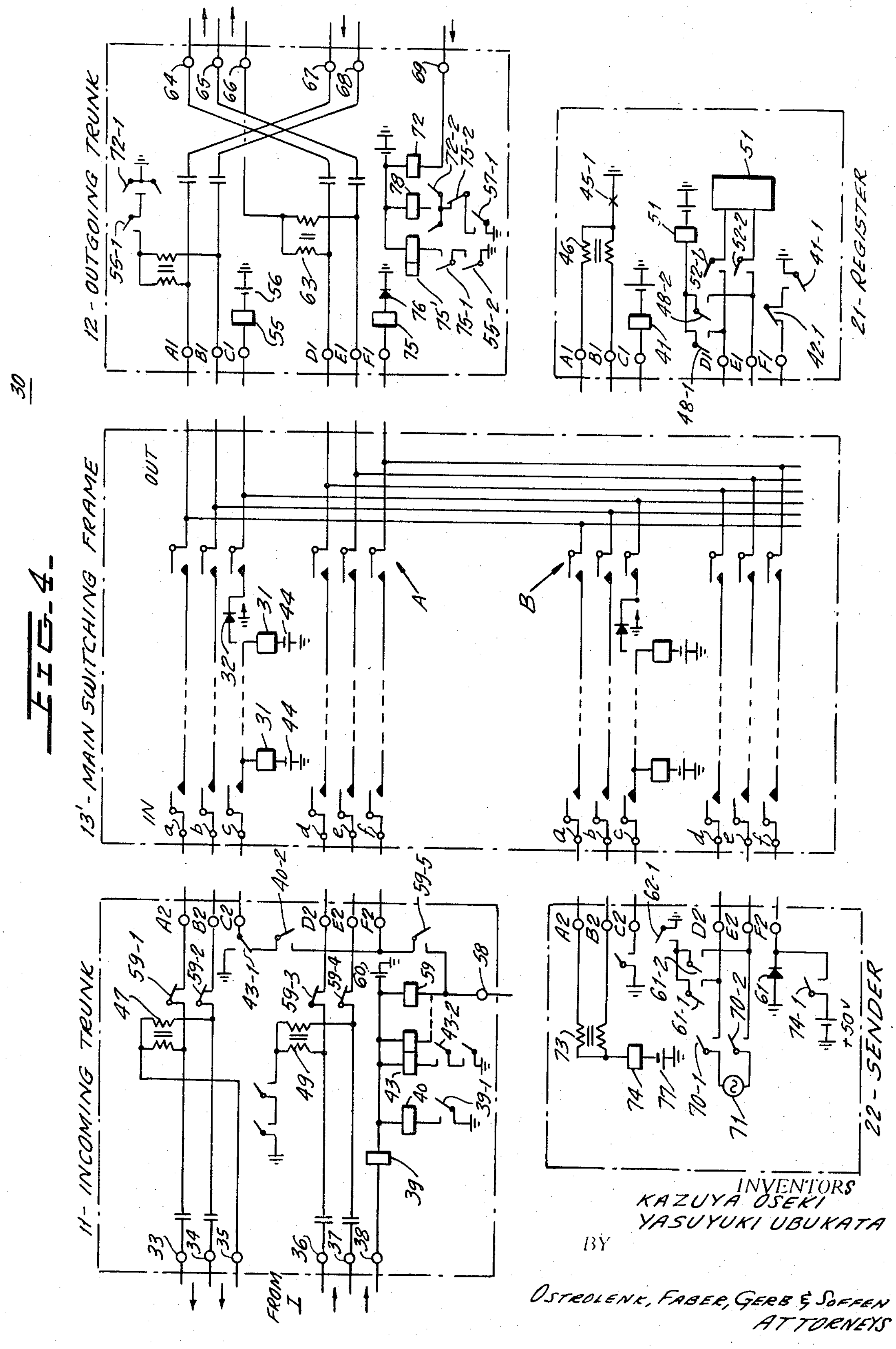

FIG. 4 is a schematic diagram showing the individual functional units of FIG. 3 in greater detail.

Figure 1:
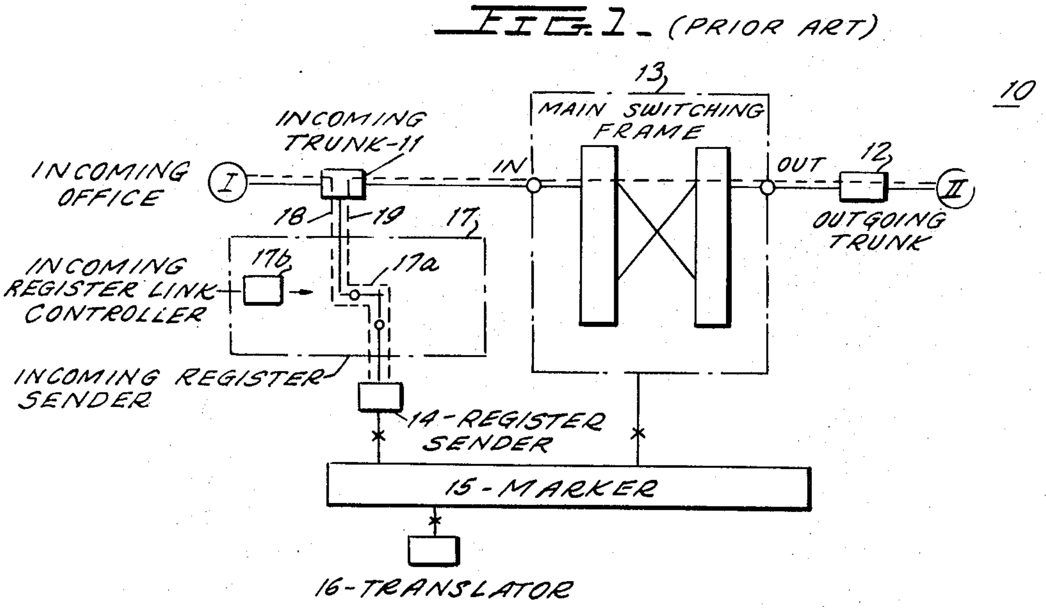
FIG. 1 (PRIOR ART)
FIG. 1 is a simplified block diagram showing a conventional common-control 4-wire tandem switchboard utilizing incoming register-sender links.

FIG. 1 shows, in simplified block diagram form, a trunking system of the conventional common-control 4-wire tandem switchboard type 10, which is comprised of an incoming trunk circuit 11; a preceding office I (i.e. the call incoming side); an outgoing trunk circuit 12; and a subsequent office II (i.e., the outgoing side). The main switching frame 13 is employed in 4-wire switching and is generally comprised of 5-wire switches (not shown). IN and OUT respectively denote the inlet and outlet side of the main switching frame 13. The register-sender, the marker, and the translator are designated by the numerals 14, 15 and 16, respectively, while the incoming register-sender link unit provided for the purpose of connecting the incoming trunk 11 to the register-sender is identified by the numeral 17. 17*a* identifies the switch which is generally of a one or two-stage connection type and 17*b* identifies the controller circuit for controlling connections of the incoming register-link switch.

The sequence of connections from the incoming trunk 11 to the outgoing trunk 12 occur as follows:

As soon as the incoming trunk 11 has been seized by the preceding office side I, the incoming register-sender link controller 17*b* operates to select and idle register-sender 14 and to close switch 17*a* so that the incoming trunk 11 establishes a connection with the register-sender, as indicated by the dotted line 18. In the case where a conventional "proceed-to-send" signal (also commonly referred to as the "start dialing signal") is to be sent back to the preceding office I, the signal is sent from the register-sender circuit 14 via the incoming register-sender link switch 17*a* and the incoming trunk circuit 11, as indicated by the dash-line route 18. Upon confirmation of the reception of the start-to-dial signal by the preceding office I, that office will then transmit the selecting signal consisting of the called office code and the called subscriber's number.

In applications where a "proceed-to-send" signal is not employed, the selecting signal is sent directly from the preceding office I (for example, a step-by-step office) to the incoming trunk 11 after a minimum pause interval. The selecting signal is transmitted from the incoming trunk 11 to the register-sender 14 over the aforementioned route 18 and the signal is stored in the register portion (not shown) of the register-sender circuit 14. The stored signal information is then transferred to the marker circuit 15 in order to have the translator circuit 16 translate the signal. Upon completion of translation, the marker circuit 15 siezes an idle outgoing trunk 12 and establishes a connection between the outgoing trunk 12 and the incoming trunk 11 through the main switching frame 13. Whereas FIG. 1, as well as FIGS. 2–4, to be subsquently described, show only a single incoming trunk 11, outgoing trunk 12 and either register-sender or separate register and sender circuits, it should be understood that a plurality of such circuit can be provided as is conventional and singular circuits have been shown in each figure only for purposes of simplicity. The route which exists between the marker and the outgoing trunk for selection of the available outgoing trunk, is not shown. However, any conventional arrangement for selective connection therebetween may be employed.

During this time the connection between the preceding office side I and the following office side II is interrupted inside of the incoming trunk 11. During this interrupted period, signals are transmitted to and from the following office side over the route indicated by the dashed line 19 which consists of the following circuits:

The register-sender 14, the incoming register-sender link switch 17*a*, incoming trunk 11, main switching frame 13 and outgoing trunk 12.

In the case where the "proceed-to-send" signal (also refererd to as the start dialing signal, as was previously mentioned) arrives from the following office II, the signals reach the sender unit of the register-sender 14 from the outgoing trunk 12 by way of route 19 and, upon confirmation of reception of the signal by register-sender circuit 14, the selecting signal is transmitted from the sender unit over the same route 19, but in the opposite direction, to outgoing trunk 12.

Likewise, in the case where the proceed-to-send signal is not employed (i.e., when step-by-step switchboards are utilized) the selecting signal is then transmitted to the following office after the minimum pause interval. As soon as the transmission of the selecting signal has occurred (or the minimum pause interval has elapsed), the connection route between the preceding office I and the subsequent office II which has been interrupted in the incoming trunk 11, is established by a 4-wire connection route through the main switching frame 13. Once this connection is established, both the incoming register-sender link switch 17*a* and the register-sender circuit 17 release. It can clearly be seen from the foregoing description that the connection scheme of FIG. 1 requires a separate incoming and outgoing links for the combined register-sender circuit 14.

Figure 2:
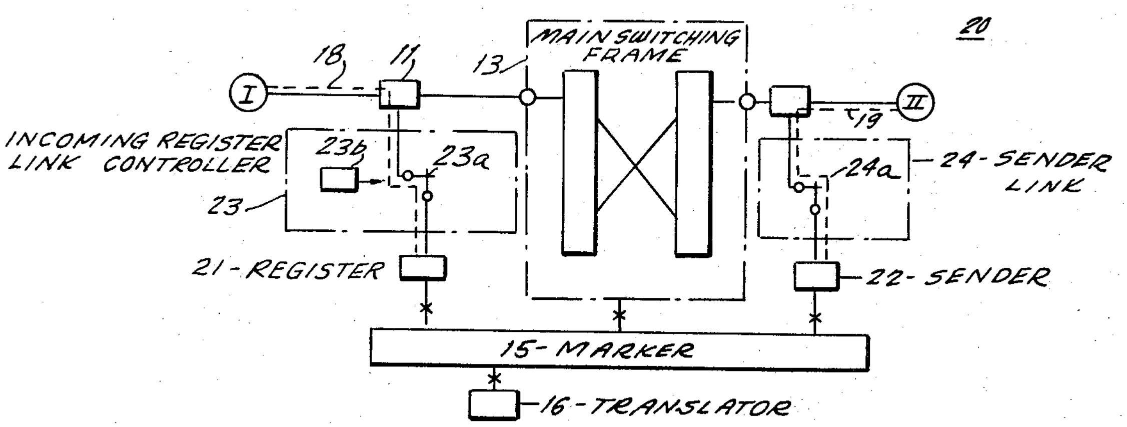
FIG. 2 (PRIOR ART)
FIG. 2 is a block diagram showing a conventional common-control 4-wire tandem switchboard employing separate register and sender circuits and having independent incoming register and outgoing sender circuit links.

FIG. 2 shows a trunking scheme for another type of conventional common-control 4-wire tandem switchboards 20 wherein like elements, as between FIGS. 1 and 2, are designated with like numerals. In the embodiment shown in FIG. 2, the combined register-sender circuit 14 of FIG. 1, is divided into separate register and sender units 21 and 22, respectively. The principle of operation of the switching structure shown in FIG. 2, however, is essentially the same as that for the circuitry of FIG. 1. In FIG. 2, 21 and 22, respectively, denote the register and sender circuits, while 23 denotes the incoming register link, that is a unit having the functions of establishing a connection route over which signals are transmitted to and from the preceding office side I. The incoming register link 23 is comprised of the incoming register link switch 23*a* and the incoming register link controller 23*b*. The connecting route between register 21 and preceding office side I is indicated by the dashed line 18. The sender link is designated by the numeral 24, which is comprised of sender link switch 24*a*, establishes a connection route between the sender (which may be the sending office I or an office preceding that) and the following office (which may be the office II, or another office following that) as well as the connection rute between the sender unit 22 and the following office side II. The sender link switch 24*a* is normally comprised of a one or two-stage connecting structure and the connection is usually performed under control of the marker circuit 15. The connection route is indicated by the dashed line 19.

Since the routes 18 and 19 of FIG. 2 have the same functions as the routes 18 and 19, respectively, of FIG. 1, a description will now be given of the distinctions in connections between the two tandem switching systems:

Route 18 is established by the incoming register link controller 23*b* once the incoming trunk 11 is siezed by the preceding office side I. Both the incoming register link 23 and the register 21 release after the selecting signal delivered from the preceding office has been transferred to marker circuit 15. On the basis of the information signals received, the marker circuit 15 proceeds to select an idle outgoing trunk 12 and establishes a connection between the incoming trunk 11 and the outgoing trunk 12 through the main switching frame 13. In addition thereto, marker circuit 15 selects an idle sending circuit 22 for connection between the outgoing trunk 12 and the sender circuit 22, which connection is established by means of the sender link switch 24*a*. Upon completion of transmission of the selecting signal to the following office II, the sender link switch 24*a* releases and the circuit between the main switching frame 13 and the following office side II, which has been opened in the outgoing trunk 12 is closed, thereby establishing a connection route between incoming and outgoing offices I and II, respectively.

From the foregoing description it can be seen that any conventional tandem switchboards require, in addition to the main switching frame 13, the installation of incoming register-sender links or incoming register links, plus the sender links for signal transmission and reception between preceding and following offices.

The principles of the present invention will now be described in detail in connection with FIG. 3, which shows a trunking scheme 30 for a 4-wire tandem switchboard facility designed in accordance with the principles of the present invention. As is the case with FIGS. 1 and 2, like numerals designate like circuits. The arrangement 30 of FIG. 3 shows the incoming trunk circuit 11 and the sender unit 22 as being connected to suitable input terminals provided on the main switching frame 13', which is of the 4-wire type. The main switching frame 13' is provided with multiwire switches (not shown in FIG. 3) each being 6-wires, or greater, in number. The outgoing trunk 12 and the register unit 21 are shown as being connected to suitable outlet terminals of main switching frame 13'. Marker circuit 15 is shown as being connected to the individual functional units 11, 12, 13', 21 and 22 by the dashed lines 15*a*–15*e*, respectively.

While some functional equipment has been omitted from the simplified diagram of FIG. 3, it should be understood that such functional units omitted are identical in both structure and function to those units commonly employed in conventional tandem switches.

When an incoming call is received from the preceding office equipment (not shown) and causes a connection to the incoming trunk 11 via an intertoll trunk (not shown), the marker circuit 15 initiates operation and selects and seizes an idle register unit 21, and controls the main switching frame 13' thereby. The marker circuit 15 releases control as soon as the incoming trunk 11 is connected to register 21 through main switching frame 13'. In this case, incoming trunk 11 is connected to the register 21 via the route indicated by arrow 1 in the main switching frame, on a 6-wire basis, for example. When the "proceed-to-send" signal is employed, it is transmitted from register 21 to the preceding office by way of main switching frame 13' and incoming trunk 11. This is followed by arrival of the selecting signal consisting of either dialing pulses or multi-frequency codes recorded at register 21 which counts and stores the necessary information. After all digits contained in the selecting signal have been stored in register 21, the register initiates operation of marker circuit 15. The stored information is delivered from register 21 to the marker which proceeds to cause the translator (not shown) to translate the information. This results in in the selection of an idle outgoing trunk 12 and an idle sender unit 22 and to the establishment if a connection between incoming and outgoing trunks 11 and 12 through the path indicated by arrow 2 and the connection of sender 22 with outgoing trunk 12 via the path designated by arrow 3, which connections are successively established in the main switching frame 13'. At the same time therewith, marker circuit 15 transfers the necessary information signals delivered from register 21 to sender unit 22. It should be noted at this time that the outputs of incoming trunk 11 and sender 22 are connected in common through main switching frame 13' to the input end of outgoing trunk 12. The connection route between incoming trunk 11 and register 21 is released, under control of marker circuit 15, prior to the time at which the connections are established between incoming trunk 11 and outgoing trunk 12 and between sender unit 22 and outgoing trunk 12. As soon as all of the above connections have been established, both the marker circuit 15 and the register unit 21 release.

In the case where the following office (connected to the output end of outgoing trunk 12) is provided with a facility for generating the "proceed-to-send" signal, sender unit 22 receives this signal by way of path 3 through main switching frame 13'. Upon acknowledgement of the fact that this signal has been received, the sender unit 22 transmits the selecting signal in the form of dial pulses or, alternatively, in the form of multi-frequency codes (transferred from marker circuit 15) to the following office, via path 3 and outgoing from 12. Upon the completion of the transmission of the necessary selecting signals, the sender unit 22 releases and, at the same time, the connecting route between sender 22 and outgoing trunk 12 (the path indicated by arrow 3) also releases, with the result that the only connecting route still remaining is that between incoming and outgoing trunks 11 and 12, respectively, through the path indicated by arrow 2. The circuitry is now in condition to enable a telephone conversation to take place through the above-mentioned route between incoming and outgoing trunks 11 and 12, respectively.

FIG. 4 is a detailed circuit diagram showing those pertinent functional units illustrated in FIG. 3, necessary to describe one preferred embodiment of the present invention. FIG. 4 shows the switching circuitry 30 as being comprised of a main switching frame 13' for 4-wire switching which is comprised of 6-wire switches such as, for example, the 6-wire switches A and B. The switching frame 13′ differs in one respect from known switching frames in that the control line *c* which maintains the holding magnets 31 in operation, is dissected to the left of the cross points on the output side and the line is either grounded directly with respect to the outgoing trunk 12 or may be bridged by a rectifier 32. As before, 11 and 12, respectively, designate the 4-wire incoming and outgoing trunks to be connected with carrier terminal equipment (not shown) by known methods and those circuits which are not illustrated in the incoming and outgoing trunks should be considered as being provided with conventional functions. 21 identifies the register for receiving counting and storing selecting signals, while 22 identifies the sender circuit employed for transmission of the selecting signals. It should be understood that although some circuits have not been illustrated in each of the register and sender circuits the unillustrated circuits have and perform functions well known to the prior art and further that the marker circuit employed as common control equipment has been omitted from FIG. 4 for purposes of simplicity only.

In operation:

When an incoming call arrives from the preceding office facility (not shown) and seizes and selects an idle incoming trunk 11, a signal from the preceding office equipment is applied to line 38 causing relay 39 to operate and close its contact 39–1 providing a conducting path for relay 40. Relay 40 is provided with one contact not shown) which causes the marker circuit (not shown) to initiate operation. The market circuit thereby selects and seizes an idle register circuit 21; connects terminals A2–F2 of incoming trunk 11 to terminals A1–F1 of register circuit 21 via a 6-wire line (not shown) provided in the main switching frame 13′ (which path, while not shown, is equivalent to the path designated by arrow 1 in FIG. 3). The establishment of this connection energizes relay 41 in register circuit 21 due to the fact that it is connected to control line *c* of the main switching frame which has been grounded.

After the information derived from the incoming trunk 11 has been transferred to register circuit 21 and the register has stored this information, the marker circuit then releases. The 6-wire connection route between the incoming trunk 11 and the register 21 is maintained by the main switching frame 13′, as a result of the connection to ground furnished from the register circuit side in the following manner:

The conductive path extends from ground through make contact 41–1 of relay 41; break contact 42–1 of a relay 42 (unillustrated); terminal F1; the *f*-wire in main switching frame 13′; terminal F2 of the incoming trunk 11; make contact 40–2 of relay 40 (which is closed as a result of operation of relay 40); break contact 43–1 of relay provided in incoming trunk 11; terminal C2 of incoming trunk 11; terminal C2 of incoming trunk 11; line *c* in main switching frame 13′; each holding magnet 31 and a battery (−48 volts)$_{44}$ which, in turn, has its remaining terminal return-to-ground.

From the arrangement shown in FIG. 4, it should be noted that it is possible to control the release of a route from either the side of the incoming trunk circuit 11 or the side of the register 21 through the utilization of the *f*-wire in main switching frame 13′ which holds the connection route. More specifically, release can be obtained either through the contact 40–2 of relay 40 on the inlet side of the main switching frame and/or through the contact 42–1 of a relay (unillustrated).

In facilities utilizing a "proceed-to-send" signal transmitted from register 21 to the preceding office location I after a connection has been established, the signal may be sent out in the form of a simplex ground from the contact 45–1 of a relay (not shown) via wires *a* and *b* in main switching frame 13′ and terminal 35 of the incoming trunk 11. The information signals derived from the preceding office I, which indicates which following office II is to be selected, may be transmitted either through the employment of a DP (dial pulse code) system or an MF (multi-frequency code) system, both of which systems are commonly used within a telephony intertoll network. However, identity of the preceding station I requesting the establishment of a link automatically identifies what type of system it employs for transmitting selecting signals and this enables the marker circuit to operate upon register circuit 21 so as to have either a dial pulse or a multi-frequency relay to become energized (neither of which relays are illustrated) so that the correct memory is employed to memorize the selecting information to be received. Thus, having established the identity of the calling station I and being able to identify the method of transmission of selecting signals from that location from predetermined information, the appropriate contacts are then caused to operate. For example, in the case where a dial pulse code system is employed, contacts 48–1 and 48–2 are caused to operate. The selecting signals of the dial pulse system are then transmitted in the form of simplex ground which is applied by energization of relay 39, closing contacts 39–1 and 39–2. The closure of contact 39–1 energizes relay 40, closing contact 40–1, which ground condition is applied through transformer 49, contacts 50 and wires *d* and *e* to one terminal of relay 51.

In the case where a multi-frequency code system is employed to apply the selecting signals, the same path is employed, but contacts 52–1 and 52–2 are closed, while contacts 48–1 and 48–2 remain open in order to apply the selecting signals to multi-frequency receiver 53 in the egister circuit 21.

After selecting code signals have been received, counted and stored in register circuit 21, the marker circuit operates under their control and, on the basis of the digtial information received, the marked circuit selects and seizes an idle outgoing trunk 12 and an idle sending circuit 22, in accordance with conventional methods which method and circuitry is not outlined here for purposes of simplicity.

During this selection operation the marker circuit energizes a relay (not shown) normally provided in the seized sending circuit 22 and energizes a relay (not shown) normally provided in the seized outgoing trunk 12. The energization of these relays provides a connection between the outgoing trunk 12 and the sending circuit 22 through the medium of the main switching frame 13′, which route is as follows:

The relay (not shown) normally provided in the sending circuit closes contact 54–1, establishing a route from ground through contact 54–1, line *c* of the main switching frame, terminal C1 of outgoing trunk 12, relay 55 and power source 56 whose opposite terminal is returned to ground. Energization of the relay (not shown) normally provided in the outgoing trunk circuit 12 closes normally open contact 57–1. The energization of relay 55, causes a result of establishing a path between sending circuit 22 and outgoing trunk 12 is followed by a transfer of all digital information from the register circuit 21 to the sending circuit 22 by way of the marker circuit (not shown).

Prior to the time at wihch a connection is established between the incoming trunk 11 and outgoing trunk 12, the marker circuit operates a relay (not shown) normally provided in register circut 21. The operation of this relay opens normally closed contact 42–1, interrupting the connection route between incoming trunk 11 and register 12. The connection route between the incoming trunk 11 and the outgoing trunk 12 is then established causing the oncoming trunk 12 to be connected in common with both the incoming trunk 11 and the sender 22. The terminal 58 of incoming trunk 11 is momentarily grounded under control of the marker circuit (not shown) simultaneously upon the establishment of the two connection routes. This momentary grounding energizes relays 59 and 43, the connections at this moment are ground, terminal 58, relays 43 and 59 connected in parallel and power supply 60 whose opposite terminal is connected to ground. Energization of relay 59 closes normally open contact 59–5 and opens contacts 59–1 through 59–4, respectively. The closure of contact 59–5 establishes a conductive path from ground to power supply 60, relay 59, contact 59–5, terminal F2, upper line *f* in main switching frame 13′ and lower line *f* in main switching frame 13′ to terminal F2 of sending circuit 22 and diode 61 whose opposite terminal is connected to ground potential. With this path, relay 59 maintains its operated state by the ground furnished from the terminal F2 in sending circuit 22 since the self-holding contact 59–5 is connected to the upper wire *f* in main switching frame 13′.

The connection route between incoming trunk 11 and outgoing trunk 12 is maintained as a result of energization of relay 43 which moves contact 43–1 to connection with ground potential establishing a path through line *c* of main switching frame 13′ to terminal C1 of outgoing trunk 12 and relay 55 and power source 56 which is returned to ground potential. Since the ground furnished to contact 43–1 does not provide a detour grounding path for the lower wire *c* in the main switching frame coupled to the sending circuit (as a result of the back-biasing of diodes 32) the connection routes can be released independently from one another in spite of the establishment of the connection route between the sending circuit 22 and the outgoing trunk 12 through the main switching frame 13′.

After the double connection routes have been established between incoming trunk 11 and sending circuit 22 to outgoing trunk 12, the marker and register circuits are released. Subsequent thereto the sending circuit 22, which has been connected to outgoing trunk 12 operates certain office equipment (not shown) causing the selecting signals of either the dial pulse or the multi-frequency type to be transmitted to the following office equipment II by way of outgoing trunk 12. More specifically, in the case of a dial pulse system, a relay (not shown) provided in sending circuit 22 causes contacts 61–1 and 61–2 to close. A second relay (not shown) provided in sending circuit 22 then intermittently closes contact 62–1 to transmit dial pulses through terminals D2 and E2 of sending circuit 22, lower lines *d* and *e* of main switching frame 13′, terminals D1 and E1 of outgoing trunk 12 and transformer 63 to outgoing line 66 so as to apply dialing pulses to equipment at the next office connected in tandem.

In the case where a multi-frequency code system is employed, contacts 61–1 and 61–2 remain open while a relay (not shown) provided in sending circuit 22 causes contacts 70–1 and 70–2 to close establishing the same connection route as was previously described, but in this case, connecting a multi-frequency oscillator 71 to this connection path for transmission of the multi-frequency selecting code. Obviously, the contacts 62–1 may remain open during transmission of multi-frequency code signals.

In cases where the following office equipment has a capability for generating a "proceed-to-send" signal, this signal reaches the sending circuit in the following manner:

The "proceed-to-send" signal is applied to terminal 69 energizing a relay 72 causing contact 72–1 to close. Since contact 55–1 is held closed by the energization of relay 55, a path is established through contacts A1 and B1 of outgoing trunk 12, lower lines *a* and *b* of main switching frame 13′, outlet terminals A2 and B2 of sending circuit 22, transformer 73, relay 74 and power supply 77 whose opposite terminal is connected to ground. The energization of relay 74 closes its contact 74–1 establishing a path from ground through a +50 volt supply, contact 74–1, outlet terminal F2, lower line *f* of main switching frame 13′, inlet terminal F1 of outgoing trunk 12, relay 75, and diode 76, whose opposite terminal is returned to ground.

If the "proceed-to-send" signal is transmitted earlier than the time of establishment of the connection route through the main switching frame 13′ and thereby fails to reach the sending circuit, the confirmation of the signal may be made by the following method:

The signal is initially stored in outgoing trunk 12 by operation of relay 78. This operation is caused as a result of previous closure of contact 57–1, normally closed contact 75–2 and closure of contact 72–2 as a result of energization of relay 72. On confirmation of reception of the signal that has been stored therein through the operation of relay 74, the sending circuit transmits a booster voltage to terminal F2 of the sending circuit (which path was previously described) causing relay 75 in outgoing trunk 12 to operate, closing contact 75–1. Contact 55–2 is closed as a result of energization of relay 55. This energizes relay 75′ which maintains contact 75–1 closed and which further opens contact 75–2 to release relay 78.

At the conclusion of transmission of all the selecting signals from sending circuit 22, the sending circuit releases under its own control and the connection route between sending circuit 22 and outgoing trunk 12 is released as a result of operation of the previously mentioned relay (not shown) provided in sending circuit 22 which is deenergized to open contact 54–1. This deenergizes relay 55. This operation is followed by a release of the relay 59 in incoming trunk 11. The release of relay 59 causes its contacts 59–1 through 59–4 to close and its contact 59–5 to open to establish a connection path for the voice link. Thus, a telephone conversation can be initiated through the connection route between incoming and outgoing trunks 11 and 12, respectively, which route remains connected through the energization of relay 43 which closes its contacts 43–1 and 43–2 to maintain the route and to maintain relay 43 in the energized state, respectively.

It can therefore be seen from the foregoing description that the instant invention provides a switching network which has the distinct advantages of completely dispensing with the need for conventional incoming register and sender links through the use of switches in the main switching frame, each of said switches being comprised of six or more wires within a 4-wire tandem switchboard so as to allow the main switching frame to serve the functions of establishing both incoming register links and sender links in addition to its other normal functions.

While the principles and novel features of this invention have been described above in connection with one preferred embodiment, it should be understood that various modifications may be made by those skilled in the art and that the extent of the ensuing claims comprehend all 4-wire tandem switchboards as set forth in these claims.

What is claimed is:

1. A switching network useful in providing tandem connections between preceding and following offices through intertoll trunks comprising a 4-wire switching frame having a plurality of groups of inlet and outlet terminals for selective connection to peripheral equipment, said peripheral equipment comprising at least one register circuit for receiving and storing selecting signals from the preceding office to identify the following office to be connected in the desired link;

at least one sending circuit for sending the received selecting signals to the following office;

at least one incoming trunk circuit seized under control of the preceding office for use in the requested link;

at least one outgoing trunk circuit for connection to the following office;

a marker circuit for selectively coupling said incoming trunk circuit and said sending circuit to associated groups of inlet terminals and for selectively coupling said outgoing trunk circuit and said register circuit to associated groups of said outlet terminals;

said switching frame including plural multi-wire switch means coupled between associated groups of inlet and outlet terminals for selectively coupling said register to said incoming trunk circuit, and said sender and incoming trunk circuits to said outgoing trunk circuit.

2. The switching network of claim 1 wherein said switching frame multi-wire switch means are each comprised of a first and second pair of wires for transmitting voice signals in first and second directions respectively;

a fifth wire for coupling holding signals between connected peripheral equipment for maintaining said connection between said connected peripheral equipment;

and a sixth wire for transferring selecting signals between connected peripheral equipment.

3. The switching network of claim 2 wherein said register circuit is provided with first means including a relay for maintaining said register circuit connection with said switching frame after its initial connection with said switching frame under control of said marker circuit;

second means for receiving and recording selecting signals transmitted from said preceding office.

4. The switching network of claim 3 wherein said marker circuit includes means coupled between said register circuit second means and said sending circuit for transferring selecting signals to said sending circuit;

said sending circuit being comprised of third means for transmitting selecting signals to said following office under control of said marker circuit.

5. The switching network of claim 3 wherein said register circuit second means is further comprised of fourth means for receiving dial pulse selecting signals and fifth means for receiving multi-frequency selecting signals;

sixth means including a relay responsive to the preceding office transmitting to selectively couple the appropriate one of said fourth and fifth means to said main switching frame to receive the appropriate selecting signals.

6. The switching network of claim 4 wherein said sending circuit is further comprised of fourth means for sending selecting signals of the dial pulse type to said switching frame;

fifth means for transmitting selecting signals of the multi-frequency type to said main switching frame;

and sixth means for selectively coupling one of said fourth and fifth means to said switching frame.

7. The switching network of claim 1 wherein said incoming trunk circuit is comprised of a first pair of wires for transmitting voice signals to a following office;

a second pair of wires for receiving voice signals from a following office;

a fifth wire for transferring selecting signals;

and a sixth wire for maintaining a connection with peripheral equipment established by said marker circuit.

8. The switching network of claim 1 wherein said outgoing trunk circuit is comprised of a first pair of wires for transmitting voice signals to a following office;

a second pair of wires for receiving voice signals from a preceding office;

a fifth wire for transferring selecting signals;

and a sixth wire for maintaining a connection with peripheral equipment established by said marker circuit.

9. The switching network of claim 1 wherein the multi-wire switch means for coupling said incoming trunk circuit to said outgoing trunk circuit and for coupling said sending circuit to said outgoing trunk circuit are connected in common to a selected pair of outlet terminals enabling said incoming trunk circuit and said sender circuit to be simultaneously coupled to said outgoing trunk circuit.

10. The switching network of claim 1 wherein said sending circuit is further comprised of a first pair of wires for transmitting selecting signals;

a second pair of wires for receiving selecting signals;

a fifth wire for maintaining a connection with peripheral equipment established by said marker circuit;

and a sixth wire; means coupled between said second pair of wires and said sixth wire for applying an acknowledgment signal to said sixth wire.

11. The switching network of claim 1 wherein said register circuit is further comprised of a first pair of wires for transmitting selecting signals;

a second pair of wires for receiving selecting signals;

a fifth wire for maintaining a connection with peripheral equipment established by said marker circuit;

a sixth wire; means coupled to said sixth wire for releasing said connection.

References Cited

UNITED STATES PATENTS 3,394,232 7/1968 Jaeger et al.

RALPH D. BLAKESLEE, Primary Examiner

T. W. BROWN, Assistant Examiner